United States Patent [19]

Sumiya et al.

[11] Patent Number: 4,786,558

[45] Date of Patent: Nov. 22, 1988

[54] COMPOSITE FILM AND ANTISTATIC COMPOSITE FILM COMPRISING A SWELLABLE INORGANIC SILICATE

[75] Inventors: Takashi Sumiya, Otsu; Kenji Yabe, Shiga; Takashi Mimura, Otsu; Satoyuki Minami, Mishima, all of Japan

[73] Assignee: Toray Industries, Ltd., Tokyo, Japan

[21] Appl. No.: 9,300

[22] Filed: Jan. 30, 1987

[30] Foreign Application Priority Data

Jan. 31, 1986 [JP] Japan .................................. 61-17897
Feb. 4, 1986 [JP] Japan .................................. 61-21182

[51] Int. Cl.$^4$ ..................... B32B 19/02; B32B 19/04; B32B 27/14
[52] U.S. Cl. ..................... 428/454; 428/215; 428/324; 428/363; 428/447; 428/480; 428/412; 428/473.5; 428/474.4; 428/500; 428/524; 428/532
[58] Field of Search ............... 428/331, 363, 446, 447, 428/454, 480, 500, 324, 215

[56] References Cited

U.S. PATENT DOCUMENTS 4,173,480 11/1979 Woodward ..................... 428/454 X
4,559,264 12/1985 Hoda et al. ......................... 428/324

FOREIGN PATENT DOCUMENTS 17999 2/1978 Japan .................................. 428/324
18000 2/1978 Japan .................................. 428/324

OTHER PUBLICATIONS

G. F. Walker et al., "Complexes of Vermiculite with Amino Acids", Nature, vol. 191, No. 4796, p. 1389, Sep. 30, 1961.
Garrett et al., "Swelling of Some Vermiculite-Organic Complexes in Water", Clays and Minerals, vol. 9, 1962.

Primary Examiner—John E. Kittle
Assistant Examiner—Susan S. Rucker
Attorney, Agent, or Firm—Birch, Stewart, Kolasch & Birch

[57] ABSTRACT

The present invention relates to a composite film comprising a plastic film and a protective layer which is formed on at least one surface of the film, wherein the protective layer is made of a mixture comprising (a) an inorganic swellable silicate having a layered structure and (b) a compound containing a silanol group at a weight ratio of (a) to (b) of between 1:1000 and 2:1 and an antistatic composite film comprising a plastic film and a coating layer which is formed on at least one surface of the film, wherein said coating layer is made of a mixture comprising (a) a swellable inorganic silicate having a layered structure and containing at least one ion selected from among aliphatic ammonium ions having at most 6 carbon atoms, sodium ion, silver ion and lithium ion as an interlayer ion and (b) at least one member selected from among water-soluble compounds and water-dispersible resins at a weight ratio of (a) to (b) of between 1:1000 and 2:1. These composite films are excellent in electrical characteristics, smoothness, slipperiness, anti-scratching properties, antistatic properties and the like, so that they are suitable for various uses such as electrical insulating material, wrapping material, labels, writable and erasable materials, print lamination film, magnetic recording medium, micro-film or the like.

28 Claims, No Drawings

COMPOSITE FILM AND ANTISTATIC COMPOSITE FILM COMPRISING A SWELLABLE INORGANIC SILICATE

BACKGROUND OF THE INVENTION

1. Field of the Invention

The present invention relates to a composite film having a protective layer containing an inorganic silicate having a layered structure on at least one surface thereof.

2. Description of the Related Art

Although various composite films having a protective layer containing an inorganic substance have been known up to this time, the inorganic substances used are generally granular, so that the protective layer has disadvantages in that the covering properties are insufficient and that the surface of the layer tends to become rough. Further, the use of a silicate having a layered structure is disclosed in, for example, U.S. Pat. Nos. 4,342,814, 4,131,589 and 4,131,588. However, in these patents, an unswellable mica having a small aspect ratio and a large thickness is used as a silicate, so that no desired effect can be obtained, if the amount of the mica added is small or if the thickness of the protective layer is small.

The use of a swellable silicate having a layered structure is disclosed in, for example, U.S. Pat. Nos. 4,425,465; 4,361,622; 3,784,499 and 3,669,733. However, in these patents, only the flame proofness and heat resistance of the silicate which are characteristics of general as inorganic flakes are noted. On the other hand, though an inorganic film made of a swellable silicate having a layered structure is disclosed in, for example, Japanese Patent Laid-Open No. 223218/1984, it has a disadvantage in that the handling of the silicate is troublesome because of its low cohesive force among flakes.

The inventors of the present invention have succeeded in imparting excellent electrical characteristics, antistatic properties, slipperiness or dazzle-proofness to a composite film by making its protective layer of a mixture comprising an inorganic swellable silicate having a layered structure and a specified compound, and further by using a specified ion as an interlayer ion of the inorganic swellable silicate having a layered structure.

SUMMARY OF THE INVENTION

An object of the present invention is to provide a composite film exhibiting improved electrical characteristics such as dielectric breakdown resistance or corona resistance. Another object of the present invention is to provide a composite film exhibiting improved antistatic properties. Still another object of the present invention is to provide a composite film exhibiting improved smoothness and slipperiness, particularly at a high temperature. Yet another object of the present invention is to provide a composite film having an improved rough surface and exhibiting dazzle-proofness.

First, the present invention relates to a composite film comprising a plastic film and a protective layer which is formed on at least one surface of the film, wherein the protective layer is made of a mixture comprising (a) an inorganic swellable silicate having a layered structure and (b) a compound containing a silanol group at a weight ratio of (a) to (b) of between 1:1000 and 2:1. Second, it relates to an antistatic composite film comprising a plastic film and a coating layer which is formed on at least one surface of the film, wherein said coating layer is made of a mixture comprising (a) a swellable inorganic silicate having a layered structure and containing at least one ion selected from among aliphatic ammonium ions having at most 6 carbon atoms, sodium ion, silver ion and lithium ion as an interlayer ion and (b) at least one member selected from among water-soluble compounds and water-dispersible resins at a weight ratio of (a) to (b) of between 1:1000 and 2:1.

DESCRIPTION OF THE PREFERRED EMBODIMENTS

The plastic film to be used as a substrate in the present invention may be any plastic film including single or composite one, oriented or unoriented one and expanded one.

Representative examples of the film include polyolefin film, polystyrene film, polyester film, polycarbonate film, triacetylcellulose film, cellophane film, polyamide film, polyamide-imide film, aramid film, polyimide film, polyphenylene sulfide film, polyether-imide film, polyether sulfone film, polysulfone film, polyacrylonitrile film, polyvinyl acetate film, polyether-ether-ketone film and polyether ketone film. Among them, polyester film (particularly oriented one), polypropylene film and polyphenylene sulfide film are preferred because of their small thermal dimensional change and high rigidity. Although the thickness of the plastic film is not limited, it is generally 0.5 $\mu$m to 6 mm, preferably 1 $\mu$m to 1 mm, still preferably 2 $\mu$m to 500 $\mu$m from the viewpoints of coatability.

When a composite film is used as a substrate, though neither the number of layers of the composite film nor the production process is limited, it is generally produced by co-extrusion, extrusion laminating, or adhesive laminating process.

The present invention is characterized by using a swellable inorganic silicate having a layered structure as a component of the inorganic coating material. The term "swellable inorganic silicate having a layered structure" used in this specification refers to an inorganic silicate having a layered structure and exhibiting a swellability as a result of coordination with water present between the layers. Owing to this property, the swellable inorganic silicate having a layered structure is present in the coating layer of the composite film according to the present invention as a fine particle formed by the separation of at least part of the layers.

The swellable inorganic silicate having a layered structure to be used in the present invention is a phyllosilicate having a calculated ratio of Si to O of SiO$_4$ tetrahedron of 2:5 and a crystalline structure wherein a crystalline unit lattice is repeated in the thickness direction. Representative examples of the silicate include ones represented by the general formula:

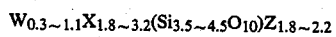

wherein W is an interlayer ion comprising at least one cation; X is Mg$^{2+}$ present at octahedral positions, part of which may be replaced with at least one ion selected from the group consisting of Li$^+$, Fe$^{2+}$, Ni$^{2+}$, Mn$^{2+}$, Al$^{3+}$ and Fe$^{3+}$; O is oxygen and Z is F$^-$ and/or OH$^-$.

According to the present invention, the above Si$^{4+}$ present at tetrahedral positions may be replaced with Ge$^{4+}$ or partially replaced with Al$^{3+}$, Fe$^{3+}$, B$^{3+}$ or the like. The swellable inorganic silicate having a layered structure according to the present invention includes such modified silicates.

Examples of the modified silicates include clays and micas, for example, natural minerals such as montmorillonite and vermiculite and synthetic minerals having the above general formula and synthesized by melting or hydrothermally, such as tetrasilicic mica, taeniolite and hectorite.

Among them, synthetic ones are particularly preferred, because they have a low impurity content and a homogeneous composition to therefore form a uniform crystal, among which ones represented by the formula:

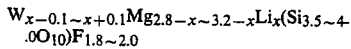

or

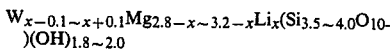

wherein x is 0.8 to 1,2, are still preferable, because they have a large crystalline size and excellent crystalline flatness. The interlayer ion W may be at least one cation. Examples of the cation include various ammonium ions such as ones represented by the general formula:

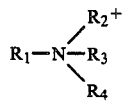

wherein $R_1$ is an alkyl group having 2 to 50 carbon atoms and $R_{2-4}$ are each a hydrogen atom or an alkyl group having 1 to 10 carbon atoms, organic cations of polyamine, ethyleneimine, acrylate, pyridine, acrylamide or choline hydrochloride and inorganic cations, for example, $Na^+$, $Li^+$, $Ag^+$, $K^+$, alkaline earth metal cations such as $Mg^{++}$, $Ca^{++}$, and $Ba^{++}$ and $Al^{+++}$. Particularly, aliphatic ammonium ion having at most 6 carbon atoms, $Na^+$, $Ag^+$ and $Li^+$ are preferred, because they impart excellent antistatic properties to the film. Further, it is particularly preferable from the viewpoints of antistatic properties that at least 60%, preferably at least 80%, still preferably at least 95% of the whole interlayer ion comprises $R_1$—$NH_3^+$ (wherein $R_1$ is an alkyl group having at most 6 carbon atoms) or $Li^+$ or a mixture of the both.

On the other hand, when at least 40%, preferably at least 60%, still preferably from 80 to 90% of the whole interlayer ion comprises

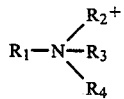

(wherein $R_1$ is an alkyl group having 7 to 50 carbon atoms and $R_{2-4}$ are each a hydrogen atom or an alkyl group having 1 to 10 carbon atoms), the obtained film is excellent in electrical insulation properties.

According to the present invention, a coated (plated) particle obtained by coating (plating) a particle of a swellable inorganic silicate having a layered structure with an electrically conductive metal or an oxide thereof may be used. The use of such a coated particle further improves the antistatic properties favorably. In this case, it is required that at least 60%, preferably at least 80%, still preferably at least 90% of the surface area of the silicate particle is covered with an electrically conductive metal. The thickness of the coating layer is preferably 2 to 500 Å, still preferably 10 to 70 Å, still further preferably 20 to 40 Å from the viewpoints of electrically conductive effect and transparency.

The electrically conductive metal may be, for example, nickel, chromium, copper, gold, silver, tin or palladium, though it is not limited to them.

Examples of the coating (i.e., plating) method suitable for the preparation of the above coated particle include electroplating, chemical plating, vacuum deposition and sputtering, among which chemical plating is particularly preferred, because it can be carried out in a state wherein the particle is suspended.

Chemical plating can be carried out by an ordinary method, for example, electroless nickel plating or electroless chromium plating.

Although the size of the swellable inorganic silicate having a layered structure is not limited, the average particle size thereof as determined by the sedimentation method is generally 0.05 to 15 μm. Further, it is preferably 0.1 to 8 μm, still preferably 0.15 to 3 μm from the viewpoint of dispersibility. Further, it is preferred from the viewpoint of dispersibility that at least 50%, preferably at least 80%, still preferably at least 90% of the whole particles has a thickness of at most 800 Å, preferably at most 400 Å, still preferably at most 100 Å.

Examples of the compound containing a silanol group to be used in the present invention include various silicone oils and silane coupling agents, among which the latter are preferred.

Although the silane coupling agent may be any known one, representative examples thereof include aminosilane coupling agents, vinyl or methacryloxysilane coupling agents, epoxysilane coupling agents, methylsilane coupling agents, chlorosilane coupling agents, anilinosilane coupling agents and mercaptosilane coupling agents. The silane coupling agent may suitably be selected depending upon the kind of a substrate. For example, when a substrate made of polyester such as polyethylene terephthalate or polycarbonate is used, an epoxysilane coupling agent represented by the formula:

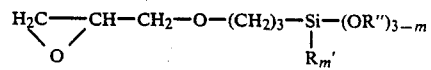

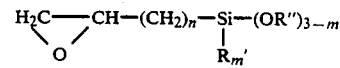

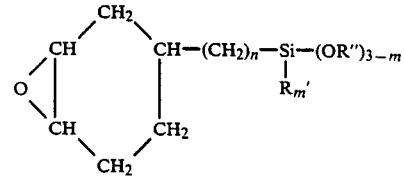

or a chlorosilane coupling agent represented by the formula:

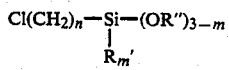

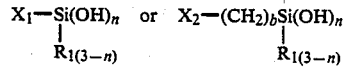

is particularly preferred from the viewpoint of applicability or adhesion to the substrate.

In the above formulas, m is 0 or 1; n is an integer of 1 to 10; R' is a hydrocarbyl residue selected from among alkyl groups having 1 to 10 carbon atoms, phenyl and cyclohexyl groups and R" is a hydrogen atom or a hydrocarbyl residue selected from among alkyl groups having 1 to 10 carbon atoms.

When a polyimide or polyphenylene sulfide substrate is used, the above epoxysilane coupling agents are preferable.

Further, when an improvement in the surface hardness is aimed at, tetraalkoxysilane hydrolyzate is preferred.

Particularly, a compound containing both an epoxy group and a silanol group in its molecule and a compound containing both a silanol group and a siloxane group are preferred, because they serve to harden the surface.

Further, it is preferred for the purpose of enhancing the surface hardness to use a mixture of a compound containing a silanol group with an epoxy compound.

Examples of the compound containing both an epoxy group and a silanol group include compounds represented by the general formula:

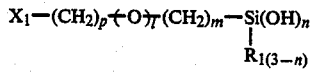

wherein $X_1$ is a group containing a moiety of

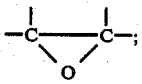

$R_1$ is an alkyl group having 1 to 6 carbon atoms or an aryl group; n is 2 or 3, and m, l and p are each an integer of 0 to 10.

Examples of the $X_1$ include

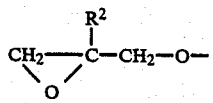

(wherein $R^2$ is a hydrogen atom or a methyl group) and

Examples of the compound include hydrolyzates of γ-glycidoxypropyltrialkoxysilane, γ-glycidoxypropylalkyldialkoxysilane and β-(3,4-epoxycyclohexyl)ethyltrialkoxysilane.

On the other hand, examples of the compound containing both a silanol group and a siloxane group include compounds represented by the general formula:

wherein $X_2$ is an alkyl group having 1 to 6 carbon atoms, a halogen atom or a vinyl, aryl, methacryloxy, mercapto, amino or $H_2N-(CH_2)_b$- NH— group; $R_1$ is an alkyl group having 1 to 6 carbon atoms or an aryl group; n is 2 or 3 and b is 1 to 6.

Examples of the compound include hydrolyzates of methyl silicate, ethyl silicate, isopropyl silicate, n-propyl silicate, n-butyl silicate, sec-butyl silicate, tert-butyl silicate, methyltrialkoxysilane, vinyltrialkoxysilane, vinyltriacetoxysilane, vinyltrialkoxyalkoxysilane, phenyltrialkoxysilane, methacryloxypropyltrialkoxysilane, chloropropyltrialkoxysilane, alkyltriacyloxysilane, γ-aminopropyltrialkoxysilane, N-β-(aminoethyl)-γ-aminopropyltrialkoxysilane, γ-mercaptopropyltrialkoxysilane, dialkyldialkoxysilane, alkylphenyldialkoxysilane, diphenyldialkoxysilane, N-β-(aminoethyl)-γ-aminopropylmethyldialkoxysilane and alkyltrichlorosilane.

The hydrolysis of these silicon compounds can be carried out by adding water or an aqueous acid such as hydrochloric or sulfuric acid and stirring. The hydrolysis is generally carried out by adding an aqueous acid to the above silicon compound either at once or stepwise. An alcohol, alkoxy alcohol or an organic carboxylic acid such as acetic acid is formed by the hydrolysis, so that the hydrolysis can be carried out without using any solvent. Alternatively, the silicon compound may be mixed with a proper solvent, followed by hydrolysis. Generally, the reaction mixture prepared by the hydrolysis is used as such. However, depending upon the object, a proper amount of a generated by-product such as an alcohol may be removed prior to the use from the reaction mixture obtained by the hydrolysis using no solvent under heat and/or a reduced pressure. Further, thereafter, a proper solvent may be added to the resulting mixture to substantially carry out the solvent exchange.

When two or more of the compounds are used, they may be each hydrolyzed or they may be mixed and hydrolyzed.

The epoxy compound to be used with a compound containing a silanol group in the present invention may be any one which is widely used in coating or casting. Examples of the epoxy compound include polyolefin epoxy resins prepared by peroxidation method; polyglycidyl ester prepared by the reaction of cyclopentadiene oxide or hexahydrophthalic acid with epichlorohydrin; polyglycidyl ether prepared by the reaction of epichlorohydrin with a polyhydric alcohol such as bisphenol A, catechol, resorcinol, (poly)ethylene glycol, (poly)propylene glycol, neopentyl glycol, glycerol, trimethylolpropane, pentaerythritol, diglycerol or sorbitol; cyclic epoxy resins; epoxidized vegetable oils; epoxy-novolac resin prepared by the reaction of phenolic novolac with epichlorohydrin; epoxy resin prepared by the reaction of phenolphthalein with epichlorohydrin and copolymers comprising glycidyl methacrylate and an acrylic monomer (such as methyl methacrylate) or styrene.

Representative examples of the methylsilane coupling agent to be used in the present invention are ones represented by the general formulas:

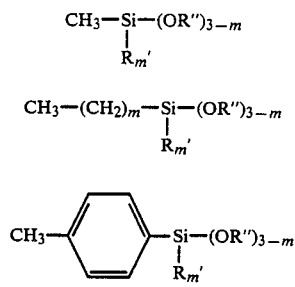

wherein m is 0 or 1; n is an integer of 1 to 10; R' is a hydrocarbyl residue selected from among alkyl groups having 1 to 10 carbon atoms, phenyl and cyclohexyl groups; R" is a hydrogen atom or a hydrocarbyl group selected from among alkyl groups having 1 to 10 carbon atoms.

Representative examples of the methylsilane coupling agent include methyltrimethoxysilane, dimethyldimethoxysilane, methyltriethoxysilane, dimethyldiethoxysilane, ethyltriethoxysilane, propyltrimethoxysilane, butyltrimethoxysilane and tolyltrimethoxysilane. Particularly, silane coupling agents of the general formula (i) are preferable from the viewpoint of erasing method, among which methyltrimethoxysilane is particularly preferable.

Representative examples of the epoxy silane coupling agent are ones represented by the following general formula:

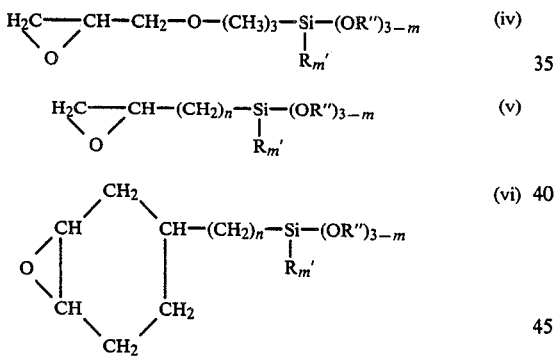

wherein m is 0 or 1; n is an integer of 1 to 10; R' is a hydrocarbyl residue selected from among alkyl groups having 1 to 10 carbon atoms, phenyl and cyclohexyl groups and R" is a hydrocarbyl group selected from among alkyl groups having 1 to 10 carbon atoms.

Representative examples of the epoxy silane coupling agent include γ-glycidoxypropyltrimethoxysilane, γ-glycidoxypropyltriethoxysilane, γ-glycidoxypropylmethyldimethoxysilane, γ-glycidoxypropylmethyldiethoxysilane and β-(3,4-epoxycyclohexyl)ethyltrimethoxysilane. Particularly, silane coupling agents of the general formula (iv) are preferable, among which γ-glycidoxypropyltrimethoxysilane is particularly preferable.

The weight ratio of the methylsilane coupling agent is preferably between 5:95 and 90:10, still preferably between 20:80 and 70:30, still further preferably between 30:70 and 60:40 from the viewpoint of writability and erasability.

These compounds having a silanol group may be used together with a curing agent and/or a curing catalyst. Examples of the curing agent (curing catalyst) include alkali metal salts of organic carboxylic, nitrous, sulfurous, aluminic, carbonic and thiocyanic acids; metal salts of octanoic and naphthenic acids; organic amino acids; organotin compounds; boron fluoride complexes; zinc borofluoride; tin borofluoride; tetramethylammonium hydroxide, tetra-n-butylphosphonium hydroxide, quaternary ammonium hydroxide, quaternary phosphonium hydroxide, aluminum chelate compounds and various epoxy curing agents. A mixture of two or more of these compounds may be used.

Particularly, aluminum compounds represented by the following general formula:

$$Al.Y_m.Z_{(3-m)}$$

wherein Y is OL (where L is an alkyl group having 1 to 6 carbon atoms); Z is a ligand derived from a compound represented by the general formula:

$$M^1COC\ H_2COM^2 \text{ or } M^3COC\ H_2COOM^4$$

(wherein $M^1$, $M^2$, $M^3$ and $M^4$ are each an alkyl group having 1 to 6 carbon atoms) and m is an integer of 0 to 3, are remarkably effective in attaining the objects of the present invention. Although examples of the aluminum compound include various ones, examples thereof which are preferred from the viewpoint of solubility in the composition, stability and effect as a curing catalyst include aluminum isopropoxide, aluminum ethoxide, aluminum tert-butoxide, aluminum acetylacetonate, aluminum bisethylacetoacetate monoacetylacetonate, aluminum di-n-butoxide monoethylacetoacetate, aluminum di-iso-propoxide monomethylacetoacetate, aluminum di-sec-butoxide monoethylacetoacetate and aluminum dimethoxide monomethylacetoacetate. A mixture of two or more of these compounds may be used.

The amount of the curing agent to be added is suitably 0.0001 to 0.5 part by weight, preferably 0.0005 to 0.2 part by weight, per part of the above silicon compound.

The water-soluble compound to be used in the present invention may be substantially any one which is water-soluble when preparing a coating fluid and is present as a polymer which is either crosslinked or uncrosslinked in the coating layer of the composite film which is the final product of the present invention.

Organic polymers or polymerizable substances having at least one polar group exhibiting a highly hydrophilic nature are preferred in structural respect. Examples of the polar group are as follows:

anionic group: $-COO^-$, $-SO_3^-$, $-OSO_3^-$,

cationic group: $-NH_2$,

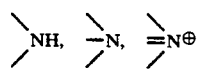

nonionic group: $-OH$, $-O-$, $-CN$, $-CONH_2$

Representative examples of the water-soluble compound include silane or titanium coupling agents; water-soluble acrylic, polyester, polyamide, epoxy or amino resins; polyvinyl alcohol; polyacrylamide; polyethylene oxide; vinyl acetate copolymers and polyvinylpyrrolidone and mixture thereof.

It is preferred that the water-soluble compound to be used in the present invention contains at least 50% by weight, still preferably at least 80% by weight, still further preferably at least 90% by weight of one exhibiting a softening point of at least 50° C., particularly preferably at least 80° C., still preferably at least 120° C. after dehydration and drying. It is a matter of course that the use of a curable resin is preferable. Such a resin is preferably selected depending upon the kind of a film used as a substrate.

Representative examples of the water-soluble polyester to be used in the present invention include copolymer prepared by copolymerizing a linear polyester with at least 20 molar % of polyethylene glycol having a degree of polymerization of 2 to 10 and at least about 8 molar % of a metal salt of an ester-forming difunctional sulfonic acid derivative; copolyester comprising a glycol component and a dicarboxylic acid component comprising an aromatic dicarboxylic acid and an aliphatic dicarboxylic acid at a molar ratio of between 10:1 and 1:10 and/or its ester-forming derivative, characterized in that A: an alkali metal salt of an ester-forming sulfonic acid derivative is contained in an amount of 3 to 10 molar % based on the whole acid component, and B: said glycol component comprises 5 to 60 molar % of 1,4-bis(hydroxyalkoxy)benzene, and copolyester comprising a glycol component and a dicarboxylic acid component comprising an aromatic dicarboxylic acid and a saturated straight-chain aliphatic dicarboxylic acid having 4 to 8 methylene units at a molar ratio of between 10:1 and 10:7.5 or its ester-forming derivative, characterized in that A: an alkali metal salt of an ester-forming sulfonic acid derivative is contained in an amount of 3.5 to 7.5 molar % based on the whole acid component, and B: said glycol component comprises 30 to 100 molar % of diethylene glycol, and that said copolyester contains phosphorus as a compound in an amount of 20 to 1000 ppm.

When a substrate made of polyester is used, it is preferable from the viewpoints of applicability and adhesion to use a copolyester comprising a glycol component and a dicarboxylic acid component comprising an aromatic dicarboxylic acid and an aliphatic dicarboxylic acid at a molar ratio of between 10:1 and 1:10, characterized in that A: an alkali metal salt of an ester-forming sulfonic acid derivative is contained in an amount of 3 to 10 molar % based on the whole acid component, and B: said glycol component comprises 5 to 60 molar % of 1,4-bis(hydroxyalkoxy)benzene, or a copolyester comprising a glycol component and a dicarboxylic acid component comprising an aromatic dicarboxylic acid and a saturated straight-chain aliphatic dicarboxylic acid having 4 to 8 methylene units at a molar ratio of 10:1 and 10:7.5 or its ester-forming derivative, characterized in that A: an alkali metal salt of an ester-forming sulfonic acid derivative is contained in an amount of 3.5 to 7.5 molar % based on the whole acid component, and B: said glycol component comprises 30 to 100 molar % of diethylene glycol, and that said copolyester contains phosphorus as a compound in an amount of 20 to 1000 ppm.

Representative examples of the water-soluble epoxy resin include glycidyl ether, heterocyclic, glycidylamine and aliphatic epoxy resins.

The water-dispersible resin to be used in the present invention may be any resin which is not soluble but dispersible as fine particle in water. It is preferred to select such a resin from among polyester resin, acrylic resin, polyolefin resin such as polyethylene, polybutene or modified polyethylene, petroleum resins, polyvinylidine chloride and fluororesins. The kind of the water-dispersible resin may be varied depending upon the kind of a substrate. For example, when a substrate made of polyester is used, polyester, acrylic or modified polyolefin resin is preferable, while when a substrate made of polyolefin is used, modified polyethylene is preferable.

Although the average size of the particle dispersed in water is not limited, it is generally 5 $\mu$m or below, preferably 1 $\mu$m or below. Particularly, the average size of 0.01 to 0.6 $\mu$m is preferable, because more homogeneous dispersion can be attained thereby.

Examples of the acrylic emulsion to be used in the present invention include copolymers comprising 80 to 99.9 molar % of an acrylic monomer mixture comprising 30 to 95 molar % of

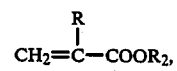

and 5 to 70 molar % of

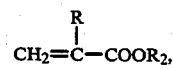

(wherein R is a hydrogen atom or a methyl group; $R_1$ and $R_2$ are each an alkyl group having 1 to 4 carbon atoms with the proviso that the number of carbon atoms of $R_1$ is equal to or less than that of $R_2$) and 0.1 to 20 molar % of an ethylenically unsaturated monomer having a group selected from among

—COOH, —CONR$_4$R$_5$, —HR$_4$R$_5$, —OH,

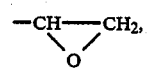

—COOCO—, (wherein $R_4$ and $R_5$ are each a hydrogen atom or an aliphatic hydrocarbyl group having 1 to 4 caron atoms), a group directly bonded to these groups or a group bonded to these groups via an aliphatic hydrocarbyl group which is bonded to the unsaturated carbon-carbon double bond. When a substrate made of polyester or polypropylene is used, the water-dispersible acrylic emulsion described above as a representative example is preferable.

According to the present invention, the weight ratio of the swellable inorganic silicate having a layered structure (a) to the compound containing a silanol group (b) is between 1:1000 and 2:1, preferably between 1:500 and 1:2, still preferably between 1:300 and 1:5. If the ratio is too small, no enhancement in electrical characteristics (particularly dielectric breakdown resistance and corona resistance) will be attained, while if the ratio is too large, the binding power between the swellable inorganic silicates having a layered structure will be so poor that cleavage will occur, thus unfavorably being poor in service durability. Further, the weight ratio of the swellable inorganic silicate having a layered structure and containing at least one ion selected from among aliphatic ammonium ions having at most 6 carbon atoms, sodium ion, silver ion and lithium ion as an interlayer ion (a) to water-soluble compounds or water-dispersible resins (b) is between 1:1000 and 2:1, preferably between 1:500 and 1:2, still preferably between 1:300 and 1:5. If the ratio is too small, antistatic effect will be small, while if the ratio is too large, the binding power between the swellable inorganic silicates having a layered structure will be so poor that cleavage will occur, thus unfavorably being poor in service durability.

Although the thickness of the protective layer according to the present invention is not particularly limited, it is generally 0.01 to 20 $\mu$m, preferably 0.05 to 5 $\mu$m, still preferably 0.08 to 3 $\mu$m.

According to the present invention, when the average concentration $M_1$ of the swellable inorganic silicate having a layered structure of the both surface layers and at a depth of from 0 to T/9 wherein T represents the thickness of the protective layer and the average concentration $M_2$ in the central part of the layer (B) having a thickness of T/10 have a relation represented by the equation:

$$M_1/3 \geq M_2$$

i.e., when the swellable inorganic silicate having a layered structure is unevenly distributed in the both surface layers in a very high concentration, the silicate exhibits film-forming characteristics and covering effect based on the loading which are more excellent than those attained when the silicate is evenly distributed. A representative example of the formation process of such a protective layer wherein the silicate having a layered structure is unevenly distributed will now be described. A specified matrix resin (compound) which is in a state of powder, solution, dispersion, emulsion or the like and has a dielectric constant of at most 20, preferably at most 8, still preferably at most 5 is added to a dispersion of the silicate having a layered structure in a solvent having a high dielectric constant, such as water or alcohol, followed by mixing. In this step, if necessary, various curing agents are further added. Although the lower limit of the dielectric constant of the matrix resin (compound) is not particularly limited, it is generally at least 0.1. The coating material thus obtained is applied to a substrate (A) by gravure coating, spray coating, reverse coating, kiss coating, knife coating, bar coating, dipping or the like methods so as to give a thickness of 0.001 to 15 $\mu$m after drying, followed by drying. Although the concentration of the coating material to be applied is not particularly limited, it is generally 0.1 to 40% by weight, preferably 0.5 to 20% by weight. The silicate content of the coating material to be applied is generally 0.01 to 20% by weight, preferably 0.02 to 5% by weight and still preferably 0.03 to 3% by weight. The coating film thus formed contains the swellable silicate having a layered structure which is unevenly distributed in the both surface layers in a very high concentration.

In contrast, when the relation represented by the equation:

$$(M_{max} - M_{min})/M_{min} < 2$$

wherein $M_{max}$ is the maximum silicate content among the contents determined by dividing the protective layer according to the present invention into ten layers each having a thickness of T/10 and examining each of the layers for silicate content and $M_{min}$ is the minimum silicate content among the contents determined in a similar manner as above, is satisfied and the parallel index of the swellable silicate having a layer structure (b) is at least 75%, the stability of the quality, the toughness of the coating film and the glossiness are excellent.

A representative example of the formation process of such a protective layer will now be described, though the process is not limited to it. A matrix resin (compound) which is in a state of powder, solution, dispersion, emulsion or the like and has a dielectric constant of more than 20 is added to a dispersion of the silicate having a layered structure in a solvent having a high dielectric constant, such as water or alcohol, followed by mixing. When a matrix resin (compound) having a dielectric constant of 20 or below is used, various substances exhibiting a protective effect must be added in an amount of 0.01 to 20 parts by weight, preferably 0.1 to 10 parts by weight per 100 parts of the silicate to thereby enhance the dispersibility. Although the substance exhibiting a protective effect is not particularly limited, representative examples thereof include gelatin, polyvinyl alcohol, water-soluble gums such as xanthan gum, guar gum, acacia gum, dextran gum or locust bean gum; various dispersants and surfactants.

The coating material thus prepared is applied to a substrate (A) by gravure coating, spray coating, reverse coating, kiss coating, knife coating, bar coating, dipping or the like methods and dried so as to give a thickness of 0.01 to 15 $\mu$m after drying. It is preferred from the viewpoint of the parallel index that the coating material to be applied has a viscosity of 50 cP or below, preferably 500 cP or below, still preferably from 0.01 to 50 cP.

Further, it is preferable that the swellable inorganic silicate having a layered structure to be used in the present invention forms a cardhouse structure, because the cardhouse structure brings about a rough surface and dazzle-proofness to the protective layer.

The cardhouse structure of the swellable inorganic silicate having a layered structure according to the present invention will now be described.

The plate surface formed by the interlayer separation of the swellable inorganic silicate having a layered structure which is caused by taking water into it to thereby form a sol has a negative layer or point charge due to the exposure of oxygen present in the base of the tetrahedral sheet, while the tip surface has a positive charge due to the exposure of $Mg^{++}$ or $Li^+$ coordinated to the octahedron or $Al^{+++}$ present at the tetrahedral position. The term "cardhouse structure" refers to a state wherein the above plate surface having a negative charge is adsorbed on the above tip surface having a positive charge at an angle $\theta$ by static attractive force and the angle $\theta$ of the contact of the plate surface with the tip surface is from 30° to 150°, preferably from 45° to 135°, still preferably 60° to 120°. The cardhouse structure having such an angle $\theta$ is effective in forming an excellently rough surface. It is preferred in order to attain the object of the present invention that at least 30%, preferably at least 50%, of the swellable inorganic silicate having a layered structure forms such a cardhouse structure. The formed cardhouse is effective in forming a protective layer having a uniformly and finely rough surface.

Although the mechanism how the swellable inorganic silicate having a layered structure forms a cardhouse structure is not evident, it is thought that the cardhouse is formed when the electrical double layer of the water which enters between layers of the silicate and promotes the dispersion of the silicate is very thin, that is, the plate surface approaches so close to the tip surface that a static attractive force is acted between the both surfaces. Examples of the process of the formation of the cardhouse include a process comprising using a coating fluid containing a swellable inorganic silicate having a layered structure, the electrical double layer of which is thinnest at its isoelectric point and adjusting the pH of the coating fluid to near the isoelectric point and a process comprising using a water-soluble organic solvent having a low dielectric constant. The former has disadvantages in that the isoelectric point varies depending upon the structure of the silicate or the kind of an interlayer ion, so that the formulation of the coating fluid is difficult and that a corrosive gas generates. Accoridngly, the latter process is preferred. The organic solvent to be used as a solvent mixture together with water is preferably one which is compatible with water and has a low dielectric constant. Particularly, it is preferable from the viewpoint of the dispersibility of the swellable inorganic silicate having a layered structure in the coating fluid and the formation of a cardhouse to use a solvent mixture satisfying the requirement: $34 \leq \Sigma \epsilon, M \leq 75$, preferably $36 \leq \Sigma \epsilon, M \leq 50$, wherein $\epsilon$ is the dielectric constant of each solvent present in a coating fluid at 25° C. and M is a weight fraction thereof.

Water is preferably used in such an amount as to disperse the swellable inorganic silicate having a layered structure without causing agglomeration and to satisfy the above requirement.

The solvent to be used as a solvent mixture together with water may be any one, so far as the cardhouse structure of a swellable inorganic silicate having a layered structure can be formed without causing agglomeration thereof in the resulting solvent mixture. Alcohols having 1 to 30 carbon atoms are preferred from the compatibility thereof with water or the dispersibility of the silicate in a coating film.

Examples of the alcohol include methanol, ethanol, 1-propanol, 2-propanol, 2,2,2-trifluoroethanol, 1-butanol, 2-butanol, 2-methyl-1-propanol, isopentyl alcohol, cyclohexanol, ethylene glycol, propylene glycol, 2-methoxyethanol, 2-ethoxyethanol, benzyl alcohol, diethylene glycol, triethylene glycol and glycerol.

Particularly, the use of methanol, ethanol, 1- or 2-propanol, 1- or 2-butanol, 2-methoxyethanol or 2-ethoxyethanol is preferable from the evaporability of a solvent or the dispersibility of the silicate. Two or more of these alcohols may be used as a solvent mixture together with water.

Although the roughness of the surface is not particularly limited, the central line-average surface roughness ($R_a$) may be 0.1 to 2.0μ and the maximum surface roughness ($R_t$) may be 0.5 to 20μ. Particularly, it is preferred that the former is 0.2 to 1.0μ, while the latter is 1.0 to 8.0 μ.

Particularly, when $R_a$ is 0.1 to 0.8μ and $R_t$ is 0.7 to 7.0μ, the obtained composite film exhibits excellent writability and erasability.

The production process of the composite film according to the present invention will now be described, though it is not restricted by the following description.

First, a plastic film to be used as a substrate is provided. If necessary, this film may be subjected to corona discharge treatment in air or other atmosphere. Alternatively, the film may be treated with an ordinary anchor treatment such as urethane or epoxy resin, though such treatment is generally unnecessary. A composition comprising a swellable inorganic silicate having a layered structure, a specified resin and a solvent is applied to the film thus prepared by a known method such as gravure, reverse or spray coating and dried at 60° to 250° C. for from 1 sec to 15 minutes. Although the solvent to be used in this step is not particularly limited, it is generally preferable to use a solvent having a high dielectric constant, such as water or alcohol. However, when a film having a rough surface is desired, another solvent is used.

Alternatively, a coating film which has been prepared separately may be laminated with a substrate. Since, however, a film comprising the silicate having a layered structure is poor in strength, a process which comprises applying the composition directly to a substrate is preferable.

Alternatively, a process which comprises applying the coating fluid to at least one smooth surface of a polyester film which has been oriented in one direction and orienting the obtained composite film in a direction perpendicular to the above direction during or after the drying and, if necessary, re-orienting the film in the former direction, followed by thermal treatment is possible. To speak more precisely, a coating fluid is applied by various coating methods to at least one surface of the longitudinally oriented film prepared by melt-extruding the materials with an ordinary film-forming machine, cooling the film and stretching it by 2 to 9 times, prior to the stretching in the transverse direction.

When the coated film is further stretched, the coating weight per one surface is preferably 200 to 4000 mg/m², still preferably 600 to 2800 mg/m² in terms of solid content. Before the composite film is transversely stretched, the coating layer of the film must be dried to such an extent as not to interfere with the transverse stretching. Therefore, it is preferable that the drying rate of water in a stenter preheater of a biaxial stretching machine is 3 to 100%/sec.

When the silicate content of the coating fluid is particularly so large that the coating layer causes cracking by stretching, it is preferable that a highly polar organic ion such as polymer, oligomer or monomer of acrylate or acrylamide is coordinated in between the layers or used as an interlayer ion to thereby enhance the compatibility of the silicate with a matrix resin.

Further, the silicate containing cations, preferably primary, secondary or tertiary ammonium and hydroxyl group, such as the mica having choline chloride as an interlayer ion can be preferably used.

The composite film according to the present invention has the above construction which is characterized by having a protective layer containing a swellable inorganic silicate having a layered structure, so that it exhibits the effects which will be described. That is to say, by providing a thin protective layer containing the specified silicate, (1) excellent electrical characteristics such as dielectric breakdown resistance or corona resistance can be attained, (2) an antistatic effect exhibiting no temperature dependence can be attained, (3) the obtained composite film exhibits excellent smoothness and slipperiness, so that a magnetic recording material having good running properties and good electromagnetic conversion or a thermal printer ribbon having excellent anti-sticking quality can be produced, and (4) the composite film has a uniformly and finely rough surface, so that it can be used in various uses requiring such characteristics (for example, dazzleproof uses or writing uses).

The composite film according to the present invention is suitable for electric field relaxing material of capacitors or cables, owing to its excellent electrical characteristics, while it is useful as a sheet keyboard, leader tape, display or overlay material requiring anti-scratching properties and abrasion resistance, owing to its high surface hardness. Further, it can be used as writing material such as electronic writing boards or facsimile or base material for printers, owing to its excellent writability and erasability.

Further, a thermal transfer material can be produced by providing an ink transfer layer on the plastic surface (i.e., the surface other than that of the protective layer) of the composite film according to the present invention, while a magnetic recording medium can be produced by providing a magnetic layer on the plastic surface.

Furthermore a film for a plant culture house can be produced by employing a plastic film containing an UV absorber or a fluororesin film as a plastic film layer of the composite film according to the present invention.

Further, a label or photosensitive material can be produced by providing an adhesive layer or a photosensitive layer on the plastic surface (i.e., the surface other than that of the coating layer) of the antistatic composite layer according to the present invention.

The measurement and evaluation methods employed in the present invention will now be described.

(1) Surface resistivity: determined with respect to a sample which has been allowed to stand in a room of 25° C. and a RH of 65% for 8 hours (referred to as "room temp.") and, if necessary, one which has been dried in a vacuum dryer of 120° C. (referred to as "after drying") by the use of a super insulation-resistance tester.

(2) Corona resistance, visible corona start and extinction voltages: Corona resistance is a time which has elapsed until a sample causes breakdown which is determined in an atmosphere having a temperature of 20±5° C. and a relative humidity of 65±5% by connecting a sample to aluminum foil electrodes, applying a direct current according to JIS C 5102 between the both electrodes and increasing the voltage to 20% of the breakdown voltage with an increasing rate of 100 V/sec. The visible corona start voltage refers to the voltage at which visible corona generates in the above test, while the visible corona extinction voltage refers to the voltage at which visible corona terminates in the above test wherein the voltage between the electrodes is decreased with a decreasing rate of 100 V/sec.

(3) Adhesion: determined by applying a commercially available cellophane adhesive tape (a product of Nichiban Co., Ltd.) to the inorganic coating layer and peeling it at a peel angle of 90°. When the area ratio of the part of the cellophane tape to which the inorganic coating layer adheres is less than 40%, the adhesion to a substrate is shown by "O", while when it is 40% or above, it is shown by "X".

(4) Haze: determined according to ASTM-D-1003-61.

(5) Coefficient of static friction $\mu_s$: determined according to ASTM-D-1894 B-63 and by the use of a slip tester.

(6) Average surface roughness ($R_a$) and maximum surface roughness (Rt): determined by the use of a pin-touch surface roughness tester (a product of Kosaka Kenkyu-jo Co., Ltd.: SE-3E) according to JIS B0601 wherein the cut-off is 0.08 mm and the measuring length is 4 mm.

(7) Coating thickness: The film having a rough surface after coating and drying is examined for thickness by microscopic observation. The average of both the peak and the trough is employed with respect to a rough surface.

(8) Glossiness: determined by the use of an angle-variable glossmeter of a type of VG-107 (a product of Nippon Denshoku Kogyo Co., Ltd.) and according to JIS Z 8741 wherein the angle of incidence and illumination is 60°. The lower the glossiness, the more excellent the dazzle-proofness (an optical reflection inhibiting effect).

(9) Anti-scratching properties: The surface is rubbed fifty times with a steel wool #0000 under load of about 500 g and observed with the naked eyes. A sample of no scratch is shown by "O", one of the slight scratch is shown by "Δ", while one of significant scratch is shown by "X".

(10) Pencil hardness: determined according to JIS K 5400.

(11) Writing properties: The protective surface on which clear characters or pictures can be written with a chalk for a blackboard is shown by "O", one on which characters or pictures can be written, though they are not clear, is shown by "Δ", while one on which characters or pictures can hardly be written is shown by "X".

(12) Degree of cardhouse formation:

A protective layer is cut in the thickness direction into ultra-thin pieces. The pieces are observed by the use of a transmission electron microscope (a product of JEOL, Ltd.; JEM-1200EX) with an accelerating voltage of 100 kV. The degree of cardhouse formation C is determined by the use of the sectional photograph of ten samples and according to the following equation:

$$C(\%) = \frac{\text{Number of cardhouse-forming contacts}}{\text{Number of silicates having a layered structure}} \times 100$$

The criteria are as follows:
O: C≧30%
Δ: 30% >C≧10%
X: 10%>C

(13) Writability:

Writing on a sample is carried out by the use of a commercially available marker for a whiteboard ("Sakura marker for whiteboard WBK"; a product of Sakura Kurepasu Co., Ltd.) under a push load of 200 to 300 g. The creakiness during writing and cissing after writing are evaluated according to the following criteria:

◎: no creakiness occurs with low drag, and no cissing is observed,

O: no creakiness occurs but with drag, and cissing is hardly observed,

Δ: slight creakiness occurs with high drag, and partial cissing is observed, and
X: significant creakiness occurs and significant cissing is observed.

(14) Erasability: Writing is carried out in a similar manner as above. The samples are allowed to stand under the conditions which will be described. The erasing is carried out with a commercially available eraser made of an acrylic non-woven fabric.
(a) The erasing is carried out at a room temperature just after the writing.
(b) The erasing is carried out after the samples have been allowed to stand in an atmosphere of 40° C. and a RH of 100% for 16 hours.

The evaluation of erasability is carried out according to the following criteria:
◎: no trace remains and erasing is easy,
O: trace hardly remains, but erasing is difficult,
Δ: slight trace remains, and
X: significant trace remains.

(15) Adhesion of erasing dreg
The adhesion of erasing dreg with respect to a sample after writing and erasing at a room temperature is judged according to the following criteria:
◎: erasing dreg is hardly observed,
O: a small amount of fine powder remains,
Δ: a significant amount of fine powder remains, and
X: a significant amount of coarse particle remains.

Now, the present invention will be described by referring to the following Examples.

Examples 1 to 4 and Comparative Examples 1 and 2

A semiconductor layer comprising a composition which will be described below was formed on a biaxially oriented polyethylene terephthalate film having a thickness of 12 μm. The composition was applied as a 5% by weight sol so as to give a thickness after drying of 0.3 μm. The drying was carried out in a hot air of 165° C. for 2 minutes.

[Composition of protective layer]
Silicate having a layered structure (A):

$WMg_2Li(Si_4O_{10})F_2$ wherein W is $CH_3-(CH_2)_3-NH_3^+$ (referred to merely as "butylamine-TN")
Silane coupling agent (B):

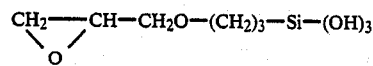

The weight ratio (A/B) is shown in Table 1.

As shown in Table 1, when the amount of the silicate was less than the lower limit according to the present invention, the visible corona generating and terminating voltages were both low and the corona resistance was hardly improved, which is not preferred (Comparative Example 1). On the contrary, when the amount was larger than the upper limit defined above, the visible corona generating and terminating voltages were both high and the corona resistance was excellent. However, the adhesion was too poor to use (Comparative Example 2). As described above, only the composition having a weight ratio (A/B) within the range according to the present invention could exhibit excellent qualities. Particularly, when the ratio was between 1:30 and 1:6, the visible corona generating state and the corona resistance were both favorably excellent (Example 3).

Examples 5 to 7 and Comparative Examples 3 to 6

The same procedure as the one described in Example 1 was repeated except that $Na\ Mg_2Li(Si_4O_{10})F_2$ (referred to merely as "Na-TN"), $Na_{1/3}Mg_{22/3}Li_{1/3}(Si_4O_{10})F_2$ (referred to merely as "Na-HT"), $NaMg_{2.5}(Si_4O_{10})F_2$ (referred to merely as "Na-Ts") or an unswellable silicate having a layered structure (Dimonite PDM-7; a product of Topy Industry) was used instead of the silicate used in Example 1. The obtained composite films and a substrate film having no protective layer were evaluated in a similar manner to that used in Example 1. In all cases where a swellable silicate having a layered structure was used, excellent results were obtained (Examples 5 to 7). When an unswellable silicate having a layered structure was used or when no protective layer was formed, the visible corona generating and terminating voltages and the corona resistance were unsatisfactory.

TABLE 1

| | Comp. Ex. 1 | Example 1 | Example 2 | Example 3 | Example 4 | Comp. Ex. 2 | Example 5 | Example 6 | Example 7 | Comp. Ex. 3 | Comp. Ex. 4 | Comp. Ex. 5 | Comp. Ex. 6 |
|---|---|---|---|---|---|---|---|---|---|---|---|---|---|
| Silicate having a layered structure (A) | butyl-amine-TN | butyl-amine-TN | butyl-amine-TN | butyl-amine-TN | butyl-amine-TN | butyl-amine-TN | Na—TN | Na—HT | Na—Ts | unswellable mica | unswellable mica | unswellable mica | unswellable mica |
| Water-soluble compound (B) | epoxy-silane | epoxy-silane | epoxy-silane | epoxy-silane | epoxy-silane | epoxy-silane | epoxy-silane | epoxy-silane | epoxy-silane | epoxy-silane | epoxy-silane | epoxy-silane | epoxy-silane |
| Weight ratio (A/B) | $1/10^4$ | 1/300 | 1/50 | 1/10 | ⅓ | 5/1 | 1/10 | 1/10 | 1/10 | ⅓ | 1/10 | $1/10^4$ | — |
| Surface resistivity (Ω) | $10^{16}$ | $10^{12}$ | $10^{12}$ | $10^{12}$ | $10^{10}$ | $10^{10}$ | $10^{12}$ | $10^{11}$ | $10^{12}$ | $10^{16}$ | $10^{16}$ | $10^{16}$ | $10^{16}$ |
| Corona resistance (min) | 3 | 7 | 8 | 14 | 5 | 3 | 13 | 11 | 12 | 2 | 2 | 2 | 2 |
| Visible corona generating voltage (kV) | 0.33 | 0.37 | 0.40 | 0.41 | 0.42 | 0.42 | 0.40 | 0.39 | 0.38 | 0.33 | 0.34 | 0.33 | 0.33 |
| Visible corona terminating voltage (kV) | 0.29 | 0.33 | 0.35 | 0.36 | 0.38 | 0.37 | 0.36 | 0.34 | 0.33 | 0.29 | 0.29 | 0.29 | 0.29 |
| Adhesion | | | | | | X | | | | | | | — |

Examples 8 to 11 and Comparative Examples 7 and 8

A biaxially oriented polyethylene terephthalate film having a thickness of 20 μm was subjected to corona discharge treatment. An antistatic layer having a composition which will be described below was formed on the treated film. The composition was applied as a 5% by weight sol so as to give a thickness after drying of 0.2 μm. The drying was carried out in a hot air of 150° C. for 2 minutes.

[Composition of antistatic layer]

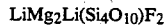

(referred to merely as "Li-TN")

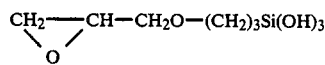

(hereinafter referred to merely as "Li-HT") (Example 12) was used instead of Li-TN. The physical properties of the obtained composite films were examined. When a swellable silicate according to the present invention was used, an antistatic effect was attained, while when an unswellable silicate was used, neither antistatic properties nor smoothness was exhibited.

Example 13

The same procedure as the one described in Example 8 was repeated except that a copolyester prepared from an acid component comprising 80 molar % of terephthalic acid and 20 molar % of 5-sulfosodium isophthalic acid and a glycol component comprising ethylene glycol was used instead of the water-soluble compound used in Example 8. The obtained composite film exhibited excellent antistatic properties and can stand use sufficiently.

TABLE 2

| | Comp. Ex. 7 | Example 8 | 9 | 10 | 11 | Comp. Ex. 8 | 9 | 10 | Example 12 | Comp. Ex. 11 | Example 13 |
|---|---|---|---|---|---|---|---|---|---|---|---|
| Silicate (A) | Li—TN | Li—TN | Li—TN | Li—TN | Li—TN | Li—TN | unswellable silicate | unswellable silicate | Li—HT | — | Li—TN |
| Water-soluble compound (B) | epoxy silane | epoxy silane | epoxy silane | epoxy silane | epoxy silane | epoxy silane | epoxy silane | epoxy silane | water-soluble polyester | — | epoxy silane |
| Weight | 3/10000 | 1/300 | 1/100 | 1/10 | ⅓ | 3 | 1/300 | 1/100 | 1/300 | — | 1/300 |
| Surface resistivity | | | | | | | | | | | |
| room temp. | >10¹⁶ | 7/10¹² | 4/10¹¹ | 2/10⁸ | 6 × 10⁷ | 2 × 10⁷ | >10¹⁶ | >10¹⁶ | 6 × 10¹² | >10¹⁶ | 2 × 10¹² |
| after drying | >10¹⁶ | 8 × 10¹² | 5 × 10¹¹ | 4 × 10⁸ | 6 × 10⁷ | 3 × 10⁷ | >10¹⁶ | >10¹⁶ | 8 × 10¹² | >10¹⁶ | 3 × 10¹² |
| Haze | 2.1 | 2.3 | 2.4 | 2.4 | 2.5 | 2.7 | 3.1 | 3.3 | 2.2 | 2.0 | 2.2 |
| Adhesion | | | | | | X | | | | — | |
| Coefficient of static friction | 0.71 | 0.49 | 0.43 | 0.41 | 0.40 | 0.38 | 0.47 | 0.41 | 0.48 | 0.65 | 0.45 |
| $R_a$ | 0.010 | 0.011 | 0.013 | 0.015 | 0.02 | 0.04 | 0.16 | 0.12 | 0.011 | 0.008 | 0.012 |

The weight ratio is shown in Table 2. The Li-TN had an average particle size of 1 um and at least 50% thereof had a particle thickness of 200 Å or below. The physical properties of the composite film thus obtained was evaluated and shown in Table 2.

As shown in Table 2, when the amount of the silicate was too small, the obtained antistatic effect was insufficient (Comparative Example 7). On the contrary, when the amount was too large, the antistatic effect was sufficient, but the adhesion was unfavorably poor (Comparative Example 8). Only when the ratio was within the range according to the present invention, sufficient antistatic effect, adhesion, smoothness and slipperiness were attained (Examples 8 to 11). Particularly, when the weight ratio was between 1:200 and 1:5, the antistatic properties and the adhesion were favorably well-balanced.

Example 12 and Comparative Examples 9 and 10

The same procedure as the one described in Example 1 was repeated except that an unswellable silicate having a layered structure (Dimonite PDM-7; a product of Topy Industry Co., Ltd.) (Comparative Examples 9 and 10) or a silicate having a structure represented by the formula:

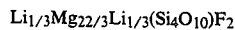

Examples 14 to 17 and Comparative Examples 12 and 13

A coating material comprising a copolymer prepared from an acid component comprising 85 molar % of terephthalic acid and 15 molar % of 5-sulfoisophthalic acid and a glycol component comprising 95 molar % of ethylene glycol and 5 molar % of diethylene glycol was applied to a biaxially oriented polyethylene terephthalate film having a thickness of 100μ so as to give a thickness of 0.1μ, thus obtaining a composite film. This composite film was used as a substrate. A protective layer having a composition which will be described below was formed on the copolyester layer of the substrate by applying a 25% by weight sol of the composition so as to give a thickness after drying of 2μ and drying the obtained composite film in a hot air of 170° C. for 2 minutes.

[Composition of protective layer]

Silicate (B): $wMg_2Li(Si_4O_{10})F_2$
wherein w is $CH_3—CH_2—CH_2—N^+—H_3$
(hereinafter referred to merely as "propylamine TN")
Silane coupling agent (A):

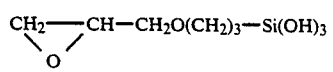  (1)

-continued

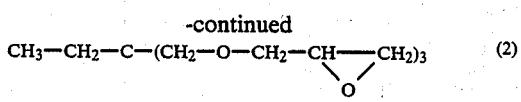

(3) Si(OH)$_4$

Acetylacetone aluminum was additionally used in an amount of 10 parts by weight per 100 parts by weight of the silane coupling agent.

Further a solvent mixture comprising (i) 15% by weight of water, (ii) 65% by weight of methanol and (iii) 20% by weight of isopropyl alcohol was used as a solvent for the above components (A) and (B). As shown in Table 3, when the amount of the silicate was smaller than the lower limit according to the present invention, the surface roughness was so low that the glossiness and the writing properties were both insufficient (Comparative Example 12). On the contrary, when it was larger than the upper limit according to the present invention, the surface hardness was lowered and the adhesion of the coating film was poor (Comparative Example 13). Thus, only when the weight ratio (A/B) was within the range according to the present invention, a high-quality composite film was obtained.

Examples 18 to 20 and Comparative Examples 14 to 16

In Comparative Examples 14 and 15 where an unswellable silicate [KMg$_3$(AlSi$_3$O$_{10}$)F$_2$, average particle size as determined by the sedimentation method: 1.0μ] was used as a silicate or Comparative Example 16 where silicon oxide (Siloide, a product of Fuji Devison Co., Ltd., particle size: 1.0μ) was used instead of a silicate, no cardhouse was formed and coarse particles formed by secondary agglomeration were detected. Further, as shown in Table 3, the qualities were unbalanced.

Examples 21 and 22

The same procedure as the one described in Example 14 was repeated except that a solvent mixture comprising 20% by weight of water, 65% by weight of methanol and 15% by weight of 1-butanol (Example 21) or a solvent mixture comprising 15% by weight of water, 35% by weight of methanol and 50% by weight of 2-ethoxyethanol (Example 22) was used instead of the one used in Example 14. The degree of cardhouse formation was so high that the surface was remarkably rough. Thus, a high-quality composite film was observed.

Examples 23 to 27

A substrate was produced by the same procedure as the one described in Example 14 except that the thickness of the biaxially oriented film was 50μ instead of 100μ. A coating material having a composition which will be described below was applied to the copolyester layer of the substrate so as to give a thickness after drying of 3μ, followed by drying in a hot air of 170° C. for 2 minute, thus forming a protective layer on the substrate.

[Composition of protective layer]

A silicate sol mixture comprising a silicate represented by the general formula: wMg$_2$Li(Si$_4$O$_{10}$)F$_2$ wherein W is CH$_3$—CH$_2$—CH$_2$—NH$_3^+$(hereinafter referred to merely as "propyl TN") and a silicate represented by the above formula wherein W is Li$^+$(hereinafter referred to merely as "Li TN") at a weight ratio of 7 to 3 was used as the silicate (B), while a mixture comprising (a) a methylsilane coupling agent hydrolyzate represented by the formula: CH$_3$—Si—(OH)$_3$ and (b) an epoxy silane coupling agent hydrolyzate represented by the formula:

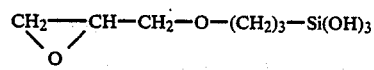

at a weight ratio given in Table 4 was used as the coupling component (A). Acetylacetone aluminum was additionally used in an amount of 10 parts by weight per 100 parts by weight of the above component (A), i.e., (a)+(b). The composition thus obtained was mixed with a solvent mixture comprising 15% by weight of water, 50% by weight of methanol and 35% by weight of ethanol.

In Examples 23 to 25 wherein the weight ratio (a/b) was between 80:20 and 20:80, the obtained composite film exhibited excellent and well-balanced properties of writability, erasability, dazzle-proofness, adhesion and anti-scratching properties.

Further, it can be understood from the comparison of the results of Examples 26 and 27 with those of Comparative Examples 17 and 18 that a high-quality composite film can be obtained only when the weight ratio (B/A) is within the range according to the present invention.

Examples 28 and 29

The same procedure as the one described in Example 23 was repeated except that a mixture sol comprising LiTN and propyl TN having a weight ratio of 7:3 was used instead of the one having a weight ratio of 3:7 (Example 28).

Separately, the same procedure as the one described in Example 15 was repeated except that a silicate represented by the formula wherein W is CH$_3$—CH$_2$—CH$_2$—CH$_2$—NH$_3^+$(hereinafter referred to merely as "butyl TN") was used instead of propylamine TN (Example 29).

In any of the Examples, a high-quality composite film exhibiting well-balanced properties was obtained.

TABLE 3

| | Comp. Ex. 12 | Example 14 | Example 15 | Example 16 | Example 17 | Comp. Ex. 13 | Example 18 | Example 19 | Example 20 | Comp. Ex. 14 | Comp. Ex. 15 | Comp. Ex. 16 | Example 21 | Example 22 |
|---|---|---|---|---|---|---|---|---|---|---|---|---|---|---|
| Silicate (B) | propylamine TN | propylamine TN | propylamine TN | propylamine TN | propylamine TN | propylamine TN | propylamine TN | propylamine TN | propylamine TN | unswellable silicate having a layered struc- | unswellable silicate having a layered struc- | Siloide | propylamine TN | propylamine TN |

TABLE 3-continued

| | Comp. Ex. 12 | Example 14 | Example 15 | Example 16 | Example 17 | Comp. Ex. 13 | Example 18 | Example 19 | Example 20 | Comp. Ex. 14 | Comp. Ex. 15 | Comp. Ex. 16 | Example 21 | Example 22 |
|---|---|---|---|---|---|---|---|---|---|---|---|---|---|---|
| Silane coupling agent (A) | | | | | | | | | | ture | ture | | | |
| (1) | 2 | 2 | 2 | 2 | 2 | 2 | 1 | 3 | 0 | 2 | 2 | 2 | 2 | 2 |
| (2) | 2 | 2 | 2 | 2 | 2 | 2 | 1 | 0 | 3 | 2 | 2 | 2 | 2 | 2 |
| (3) | 1 | 1 | 1 | 1 | 1 | 1 | 0 | 1 | 1 | 1 | 1 | 1 | 1 | 1 |
| Weight ratio (B/A) | 1/5000 | 1/500 | 1/300 | 1/100 | 1/10 | 4/1 | 1/300 | 1/300 | 1/300 | 1/300 | 1/10 | 1/10 | 1/300 | 1/300 |
| Thickness of coating film | 2.0 | 2.0 | 2.0 | 2.0 | 2.0 | 2.0 | 2.0 | 2.0 | 2.0 | 2.0 | 2.0 | 2.0 | 2.0 | 2.0 |
| Degree of cardhouse formation | | | | | | | | | | X | X | X | | |
| Surface roughness ($\mu$) | | | | | | | | | | | | | | |
| Ra | 0.065 | 0.381 | 0.402 | 0.442 | 0.472 | 0.584 | 0.388 | 0.411 | 0.375 | 0.072 | 0.884 | 1.124 | 0.521 | 0.614 |
| Rt | 0.41 | 2.52 | 3.18 | 3.11 | 3.58 | 3.99 | 3.12 | 3.71 | 3.41 | 4.81 | 10.32 | 11.38 | 4.33 | 4.88 |
| Glossiness (%) | 148 | 88 | 72 | 71 | 63 | 51 | 75 | 71 | 77 | 144 | 95 | 48 | 51 | 43 |
| Haze (%) | 4.1 | 8.2 | 10.4 | 10.4 | 12.1 | 25.2 | 11.4 | 11.8 | 10.6 | 7.1 | 28.3 | 34.5 | 15.5 | 17.4 |
| Adhesion of coating film | X | | | | | X | | | | X | X | X | | |
| Anti-scratching properties | | | | | | Δ | | | | | Δ | Δ | | |
| Pencil hardness | 3H | 3H | 3H | 3H | 2H | H | 3H | 4H | 2H | 3H | H | H | 2H | 2H |
| Writing properties | X | | | | | | | | | X | | | | |

TABLE 4

| | Example 23 | Example 24 | Example 25 | Example 26 | Example 27 | Example 28 | Example 29 | Comp. Ex. 17 | Comp. Ex. 18 |
|---|---|---|---|---|---|---|---|---|---|
| Silicate (B) | LiTN/propyl TN (3/7) | LiTN/propyl TN (3/7) | LiTN/propyl TN (3/7) | LiTN/propyl TN (3/7) | LiTN/propyl TN (3/7) | LiTN/propyl TN (7/3) | LiTN/butyl RN (3/7) | LiTN/butyl TN (3/7) | — |
| a/b | 80/20 | 50/50 | 20/80 | 50/50 | 50/50 | 50/50 | 50/50 | 50/50 | 50/50 |
| B/(a + b = A) | 1/300 | 1/300 | 1/300 | 1/5 | 1/100 | 1/300 | 1/300 | 1/2000 | 0 |
| Degree of cardhouse formation | ○ | ○ | ○ | ○ | ○ | ○ | ○ | ○ | — |
| Surface roughness ($\mu$) | | | | | | | | | |
| Ra | 0.371 | 0.355 | 0.401 | 0.461 | 0.372 | 0.281 | 0.279 | 0.072 | 0.008 |
| Rt | 3.58 | 3.44 | 3.77 | 4.12 | 3.01 | 2.33 | 2.31 | 0.48 | 0.07 |
| Grossiness (%) | 75 | 77 | 72 | 51 | 68 | 93 | 92 | 147 | 158 |
| Writability | | | | | | | | | |
| creakiness | ⊚ | ⊚ | ⊚ | ⊚ | ⊚ | ⊚ | ⊚ | Δ | X |
| cissing | ○ | ⊚ | ⊚ | ⊚ | ⊚ | ⊚ | ⊚ | ○ | ○ |
| Erasability | | | | | | | | | |
| just after | ⊚ | ⊚ | ⊚ | ○ | ⊚ | ⊚ | ⊚ | ⊚ | ⊚ |
| after 16 hours with 40% or 100% Rh | ⊚ | ⊚ | ○ | ○ | ○ | ○ | ⊚ | ⊚ | ⊚ |
| Adhesion of erasing dreg | ○ | ○ | ○ | ⊚ | ○ | ○ | ○ | X | X |
| Adhesion of coating film | ○ | ○ | ○ | ○ | ○ | ○ | ○ | X | X |
| Pencil hardness | 2H | 3H | 3H | 2H | 2H | 3H | 3H | 3H | 3H |
| Anti-scratching properties | ○ | ○ | ○ | ○ | ○ | ○ | ○ | ○ | ○ |

What is claimed is:

1. A composite film comprising:
 a plastic film and
 a protective layer which is formed on at least one surface of said plastic film, wherein said protective layer is made of a mixture comprising (a) a swellable inorganic silicate having a layered structure and (b) a compound containing a silanol group at a weight ratio of (a) to (b) of between 1:1000 and 2:1, wherein said inorganic silicate (a) comprises a phyllosilicate which contains an interlayer ion, which has a ratio of Si:O of 2:5, which is present in the form of fine particles formed by partial interlayer separation, and in which the crystalline unit lattice is repeated in the thickness direction, with not less than 40% of said interlayer ion comprising,

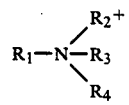

wherein $R_1$ is an alkyl group having 7 to 50 carbon atoms and $R_2$, $R_3$, and $R_4$ are each a hydrogen atom or an alkyl group having 1 to 10 carbon atoms.

2. A composite film as set forth in claim 1, wherein said plastic film is a polyester film.

3. A composite film as set forth in claim 1, wherein said compound containing a silanol group is a silane coupling agent.

4. A composite film as set forth in claim 3, wherein said silane coupling agent comprises at least one member selected from the group consisting of methylsilane coupling agents and epoxy silane coupling agents.

5. A composite film as set forth in claim 1, wherein the layer structure of said inorganic swellable silicate comprises a cardhouse shaped structure having a plate surface and a tip surface which contacts said plate surface at an angle $\theta$, said angle $\theta$ satisfying the relationship $30° < \theta < 150°$.

6. An antistatic composite film comprising:
a plastic film and
a coating layer which is formed on at least one surface of said plastic film, wherein said coating layer is made of a mixture comprising (a) a swellable inorganic silicate having a layered structure and (b) a component comprising at least one member selected from the group consisting of water-soluble compounds and water-dispersible resins at a weight ratio of (a) to (b) of between 1:1000 and 2:1, wherein said inorganic silicate (a) comprises a phyllosilicate which contains an interlayer ion, which has a ratio of Si:0 of 2:5, which is present in the form of fine particles formed by partial interlayer separation, and in which the crystalline unit lattice is repeated in the thickness direction, with not less than 60% of said interlayer ion comprising lithium ion.

7. An antistatic composite film as set forth in claim 6, wherein said plastic film is a polyester film.

8. An antistatic composite film as set forth in claim 6, wherein the layered structure of said inorganic swellable silicate comprises a cardhouse shaped structure having a plate surface and a tip surface which contacts said plate surface at an angle $\theta$, said angle $\theta$ satisfying the relationship $30° < \theta < 150°$.

9. A composite film as set forth in claim 2, wherein said compound having a silanol group is a silane coupling agent.

10. A composite film as set forth in claim 4, wherein said silane coupling agent is an epoxy silane agent and wherein said weight ratio of (a) to (b) is between 1:30 and 1:6.

11. An antistatic composite film as set forth in claim 6, wherein said component (b) comprises an epoxy silane and wherein said weight ratio of (a) to (b) is between 1:200 and 1:5.

12. A composite film as set forth in claim 1, wherein said weight ratio of (a) to (b) is between 1:500 and 1:10.

13. A composite film as set forth in claim 1, wherein said weight ratio of (a) to (b) is between 1:300 and 1:5.

14. A composite film as set forth in claim 1, wherein the thickness of said plastic film is from 2 to 500 microns and wherein the thickness of said protective layer is from 0.08 to 3 microns.

15. An antistatic composite film as set forth in claim 6, wherein the thickness of said plastic film is from 2 to 500 microns and wherein the thickness of said coating layer is from 2 to 500 angstroms.

16. A composite film as set forth in claim 1, wherein not less than 90% of said interlayer ion comprises

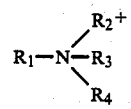

wherein $R_1$ is an alkyl group having 7 to 50 carbon atoms and $R_2$, $R_3$, and $R_4$ are each a hydrogen atom or an alkyl group having 1 to 10 carbon atoms.

17. An antistatic composite film as set forth in claim 6, wherein not less than 95% of said interlayer ion comprises lithium ion.

18. An antistatic composite film as set forth in claim 6, wherein said swellable inorganic silicate comprises a particle having at least 60% of its surface area covered with an electrically conductive metal.

19. A composite film as set forth in claim 1, wherein said swellable inorganic silicate comprises particles at least 50% of which have a thickness of at most 800 angstroms.

20. A composite film as set forth in claim 3, wherein said silane coupling agent is selected from the group consisting of amino silanes, vinyl silanes, methacryloxy silanes, epoxy silanes, methyl silanes, chloro silanes, anilino silanes, and mercapto silanes.

21. A composite film as set forth in claim 3, wherein said silane coupling agent comprises a mixture of (1) a methyl silane coupling agent and (2) an epoxy silane coupling agent wherein the weight ratio of (1) to (2) is between 80:20 and 20:80.

22. A composite film as set forth in claim 1, wherein said compound containing a silanol group is combined with a curing agent.

23. A composite film as set forth in claim 22, wherein said curing agent is combined in an amount of from 0.0005 to 0.2 parts by weight of said compound containing a silanol group, and wherein said curing agent is selected from the group consisting of aluminum isopropoxide, aluminum ethoxide, aluminum tert-butoxide, aluminum acetylacetonate, aluminum bisethylacetoacetate monoacetylacetonate, aluminum di-n-butoxide monoethylacetoactate, aluminum di-iso-propoxide monomethylacetoacetate, aluminum di-sec-butoxide monoethylacetoacetate, aluminum di-sec-butoxide monoethylacetoacetate, aluminum dimethoxide monomethylacetoacetate, and mixtures thereof.

24. An antistatic composite film as set forth in claim 6, wherein said water-soluble compounds are selected from the group consisting of silane coupling agents, titanium coupling agents, acrylic resins, polyester resins, polyamide resins, epoxy resins, amino resins, polyvinyl alcohol, polyacrylamide, polyethylene oxide, vinyl acetate copolymers, polyvinylpyrrolidone, and mixtures thereof.

25. An antistatic composite film as set forth in claim 6, wherein said water-dispersible resins are selected from the group consisting of polyester resins, acrylic resins, polyolefin resins, polyethylene, polybutene, modified polyethylene, petroleum resins, polyvinylidine chloride, and fluoro resins.

26. A composite film as set forth in claim 5, wherein said angle $\theta$ is from 60 to 120°.

27. An antistatic composite film as set forth in claim 8, wherein said angle $\theta$ is from 60 to 120°.

28. A composite film as set forth in claim 1, wherein the central line-average surface roughness of said composite film is from 0.1 to 2.0 microns and the maximum surface roughness is from 0.5 to 20 microns.

* * * * *